Patented June 28, 1949

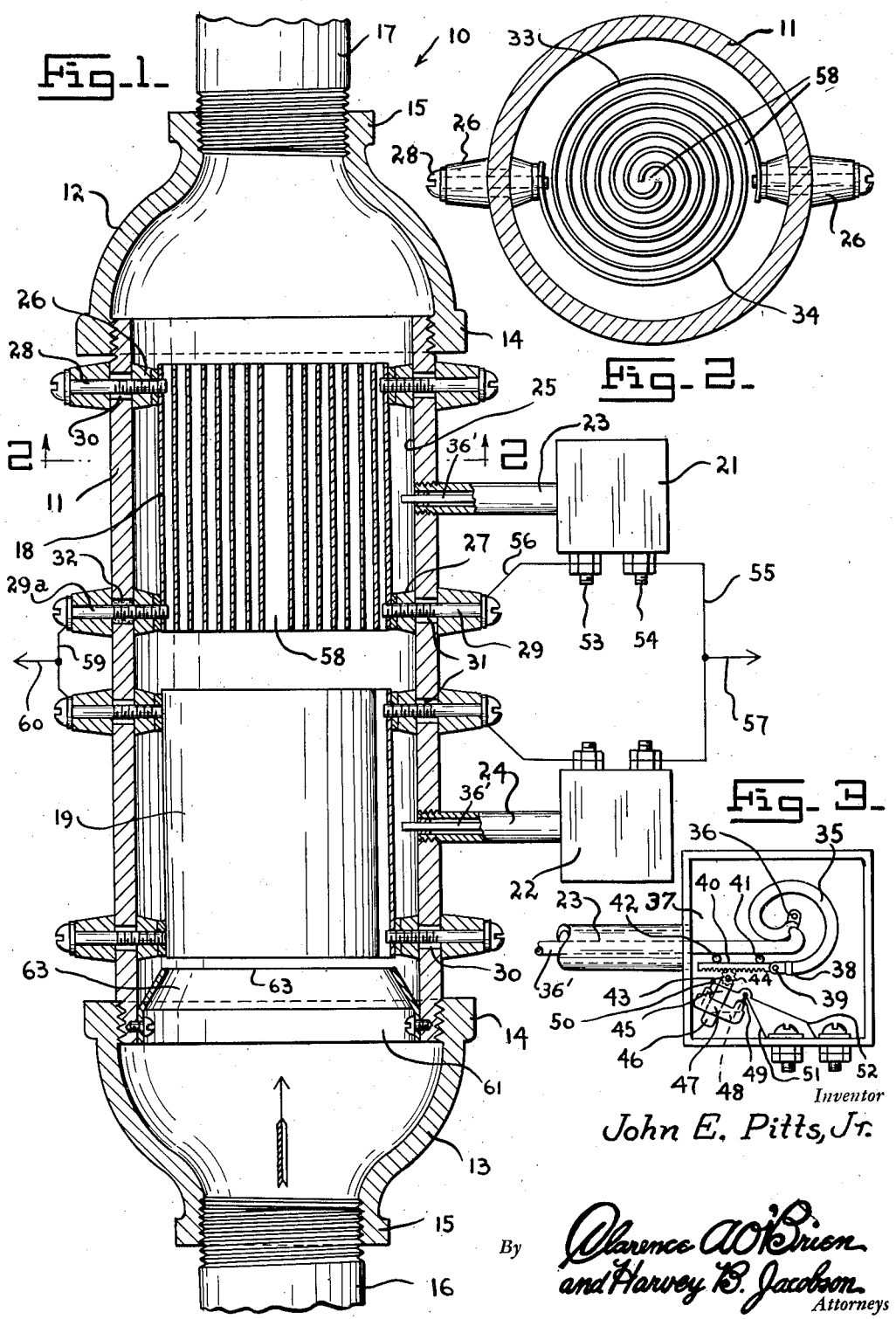

2,474,637

UNITED STATES PATENT OFFICE 2,474,637

AUTOMATIC INSTANTANEOUS ELECTRIC WATER HEATER

John E. Pitts, Jr., Los Angeles, Calif.

Application September 18, 1945, Serial No. 617,071

10 Claims. (Cl. 219—39)

My invention relates to water heaters and has for its object to provide an automatic instantaneous constant flow electric water heater.

Another object of my invention is to provide means whereby water may be instantaneously heated as it continuously flows at normal supply pressure through a water main in which my heater is connected.

A further object of this invention is to provide a heater so formed that water will be heated to a desired temperature regardless of the rate of speed at which it is withdrawn.

A still further object of the invention is to provide in an electric water heater, water pressure actuated switches for controlling the heating elements.

Other features and advantages will become more readily apparent from the following description and the accompanying illustrative drawings in which:

Figure 1 is a vertical sectional view of my heater,

Figure 2 is a sectional view taken on line 2—2 thereof, and

Figure 3 is a detail view of a switch.

Present day hot water heaters have many disadvantages among which is that, in storage heaters, the heated water which is available is limited to the capacity of the tank and when hot water has been drawn there must be a wait until the entire body of water in the tank is again heated before any hot water is available. In so-called instantaneous heaters the supply of hot water is limited by the heating capacity of the heating elements. No such heater will provide a constant flow of water at city pressure, heated to the boiling point. Furthermore, the construction of such heaters is such that the parts are continuously corroding, breaking down and wearing out. My invention seeks to overcome these difficulties by providing a heater of simple construction, automatic action and practically wear and fool proof.

The heater 10 consists of a tube 11 of any desired diameter and length depending upon the amount of heated water required, said tube being provided with upper and lower nipples 12 and 13, each having enlarging and reducing threaded ends 14 and 15, the latter for connection with the water main ends 16 and 17. Mounted within the tube 11, are spaced apart heating elements 18 and 19, each having its own switch box 21 or 22 which is connected to the tube 11 by short pipes 23 and 24.

The elements 18 and 19 are each formed of non-corrosive sheets of electrodes supported spaced from the wall 25 by non-conducting brackets 26 and 27, to which they are secured by screws 28 and 29, the former being non-conducting and the latter of conducting metal. The bores 30 and 31 through which the screws pass are stuffed with a packing 32 to prevent water seepage from the tube 11. The said elements 18 and 19 are each formed of two intercoiled, but spaced sheets 33 and 34, the former being secured to screw 29, and the latter to screw 29a.

The switch 21 includes a tube 35 having its end 36 attached to the wall 37 of the box 21. The end 36 is connected to one of the pipes 36' leading through the pipes 23 and 24 so that pressure of fluid in the tube 11 is communicated to the tube 35 and this tube 35 is in the form of a coil, the end 38 of which has fixed thereto one end 39 of a rack bar 40 held beneath rollers 41 and 42 and in engagement with a pinion 43 pivoted at 44 to wall 37. This pinion has fixed thereto a link 45, to the lower end 46 of which is attached a mercury tube 47, the mercury 48 therein being adapted to connect or disconnect the terminals 49 and 50 of conductors 51 and 52 according to the angular position of the said tube 47, and adjusted by the action of the arm end 46. The expansion tube 35 is of a nature to hold the rack bar 40 in its position as indicated in Figure 3 of the drawings which holds the tube 47 inclined and the terminals 49 and 50 disconnected when no water is flowing through heater tube 11 and the pressure therein is such as to force the end 38 of the expansible tube 35, in its outermost position. However, when water is flowing through the heater the pressure through pipe 23 is reduced and the tube 35 may contract to its normal position, causing the rack bar to rotate pinion 43 to level tube 47, whereupon the mercury 48 will connect terminals 49 and 50, closing the electric circuit through wires 51 and 52, terminals 53 and 54, wires 55 and 56, electrical source 57, conductor 29, coil 33, coil 34, through water connection 58, conductor 29a, wire 59, and current source 60.

The construction and operation of switch box 22, is identical with that of 21, with the single exception that the rack bar control tube therein is weaker and can be held back with less pressure. However, when water is passing through the heater with full force, pressure through tube 24, is still further lessened, thereby permitting the control tube in box 22, to assume its normal position, thereby closing the circuit in which is heating element 19.

A baffle collar 61 is fixed in the lower end 62 of tube 11, said collar having its upper end 63 reduced to the diameter of element 19 in order to direct a greater amount of water through the convolutions of the said element.

The operation is simple. Assume a hot water faucet connected with outlet 17, is turned on and requires less than 50 per cent of the heater capacity, pressure actuated switch 21 is actuated and closes the electric circuit. The water passing device is heated by virtue of the resistance of the water to electrical current. The power consumed and consequently the heat generated is equal to the amount of current flowing in the electrical circuit squared, multiplied by the resistance of that current, in the coil in the water. Now assume that another faucet is opened, sufficient to bring the water flow up to more than 50 per cent of the heater capacity, the switch 22 is operated and the circuit of heating element 19 is closed causing a double supply of heat for the greater passage of water flowing through the heater.

It is thought that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts such as come within the purview of the invention claimed may be resorted to in actual practice, if desired.

Having now described my invention, that which I claim as new and desire to procure by Letters Patent is:

1. A water heater including a tube through which water is conducted, a plurality of spaced heating elements mounted therein, and an electric circuit in which each element is independently connected including independent pressure operated switches operatively exposed to the pressure of said water.

2. A water heater including a tube through which water is conducted, a plurality of spaced heating elements mounted therein, and an electric circuit in which each element is independently connected including independent pressure operated switches operatively exposed to the pressure of said water, said switches each comprising a Bourdon tube operatively connected to a tilting mercury switch.

3. A water heater including a tube through which water is conducted, a plurality of spaced heating elements mounted therein, and an electric circuit in which each element is independently connected including independent pressure operated switches operatively exposed to the pressure of said water, said switches each comprising a Bourdon tube operatively connected to a tilting mercury switch by means of a rack secured to one end of said Bourdon tube, a gear operated by said rack, rollers bearing against said rack to maintain said rack in engagement with said gear, and an arm carried by said gear and supporting said mercury switch.

4. A water heater according to claim 1 and in which said switches are each housed in a chamber laterally communicating with said tube, whereby said switches are exposed to the varying static pressure of the water and not exposed to the varying dynamic pressure of the water.

5. A water heater according to claim 1 and in which said heating elements are each a set of spaced electrodes.

6. A water heater including a tube through which water is conducted, a plurality of sets of electrodes mounted therein and spaced longitudinally of said tube, and an electric circuit in which each set of electrodes is independently connected through and controlled by a pressure switch operatively exposed to the pressure of said water.

7. A water heater according to claim 6 and in which said sets are spaced inwardly from the wall of said tube, and including a frusto-conical baffle on the intake end of said tube to direct the flowing water into the set of electrodes adjacent said intake.

8. A water heater according to claim 6 and in which each of said sets of electrodes is comprised of spaced spirally intercoiled metallic sheets.

9. A water heater according to claim 6 and in which the different pressure switches have differential settings.

10. A water heater according to claim 6 and in which the switch controlling the set of electrodes adjacent the intake end of said tube is set to close at a lower pressure than the closing pressure of the switch controlling the set of electrodes adjacent the outlet end of said tube.

JOHN E. PITTS, Jr.

REFERENCES CITED

The following references are of record in the file of this patent:

UNITED STATES PATENTS

| Number | Name | Date |
| --- | --- | --- |
| 905,597 | Smyser | Dec. 1, 1908 |
| 1,744,716 | Antonelli | Jan. 28, 1930 |
| 1,920,284 | Wells | Aug. 1, 1933 |
| 2,325,722 | Walther | Aug. 3, 1943 |
| 2,347,122 | Peet | Apr. 18, 1944 |